United States Patent [19]

Lange

[11] Patent Number: 4,709,183

[45] Date of Patent: Nov. 24, 1987

[54] LINEAR MOTOR

[75] Inventor: Jürgen Lange, Eschborn, Fed. Rep. of Germany

[73] Assignee: VDO Adolf Schindling AG, Frankfurt am Main, Fed. Rep. of Germany

[21] Appl. No.: 860,636

[22] Filed: May 7, 1986

[30] Foreign Application Priority Data

May 7, 1985 [DE] Fed. Rep. of Germany ....... 3516324

[51] Int. Cl.$^4$ ............................................. H01L 41/08
[52] U.S. Cl. ..................................... 310/328; 310/317
[58] Field of Search ............... 310/323, 328, 317, 319, 310/316

[56] References Cited

U.S. PATENT DOCUMENTS

| | | | |
|---|---|---|---|
| 3,217,218 | 11/1965 | Steele | 310/328 X |
| 3,377,489 | 4/1968 | Brisbane | 310/328 |
| 3,902,084 | 8/1975 | May, Jr. | 310/328 |
| 3,952,215 | 4/1976 | Sakitani | 310/328 |
| 4,219,755 | 8/1980 | O'Neill et al. | 310/328 |
| 4,454,441 | 6/1984 | Taniguchi | 310/328 |
| 4,468,583 | 8/1984 | Mori | 310/328 |

Primary Examiner—Mark O. Budd
Attorney, Agent, or Firm—Martin A. Farber

[57] ABSTRACT

In a linear motor having a rotor and a stator, the rotor comprises two rotor elements which can be clamped in the stator by means of clamping elements as a function in each case of a signal which is fed and which are connected by at least one piezoelectric element (actuator element) by which the distance apart of the rotor elements can be varied as a function of a control signal which is fed. By the application of an electric voltage there takes place in each case an expansion of the clamping elements transverse to the direction of movement and an expansion of the actuator element in the direction of movement. One particularly advantageous embodiment resides in the fact that the rotor is developed in a flat shape and that the rotor elements contain the clamping elements in a frame-like holder, at least one side of the frame-like holder being movable with respect to the other sides.

17 Claims, 4 Drawing Figures

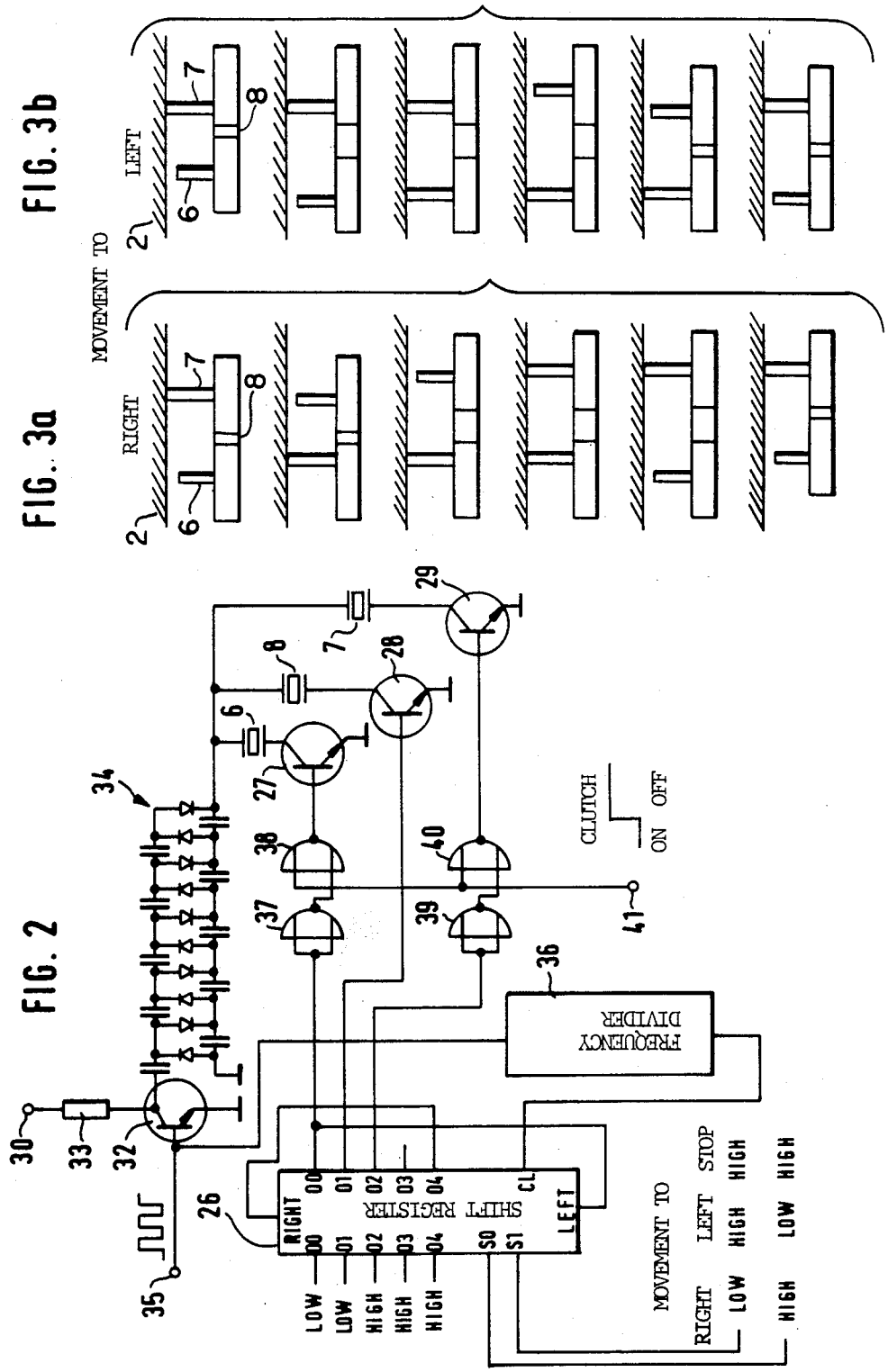

LINEAR MOTOR

FIELD AND BACKGROUND OF THE INVENTION

The invention refers to a linear motor having a rotor and a stator.

In control and regulating systems, actuators are necessary in connection with which a given linear path is moved over per unit of time. Known actuators generally employ pneumatic or electromagnetic drive elements. In the case of electric drive elements—aside from those which move over a relatively short path, namely solenoids and the like—the rotation of motors is generally converted into a linear process path by gears or pulleys. For medium and large setting forces such actuators become very large and in particular very heavy. Such electromagnetic drive elements have the disadvantage of a high current consumption and the heating inherent therein. If such electromagnetic drive elements are controlled by means of semiconductor switch elements then additional problems arise due to the lost power in said semiconductor switch elements.

The large amount of heating is particularly disturbing in cases where high ambient temperatures are already present—as, for instance, in the engine compartment of an automotive vehicle. The object of the present invention is to provide a linear motor which does not have the aforementioned disadvantages.

SUMMARY OF THE INVENTION

According to the invention, the rotor (1) comprises two rotor elements each of which can be individually clamped in the stator as a function of a signal fed to the rotor, the elements being connected by at least one piezoelectric element (for instance, actuator element 8) by which the distance apart of the rotor elements can be varied as a function of a control signal which is fed.

The linear motor of the invention has the advantage of a low power requirement when at rest and of low weight. There is the further advantage that the linear movement is produced directly and that, therefore, no gear parts which are subject to wear are required. Furthermore, the speed and the positioning of the linear motor can be electronically controlled in simple fashion.

Many of the aforementioned actuators require freewheeling properties. By this it is meant that the linearly acting drive element is mechanically movable from the driven side, which is not the case, for instance, with a motor having a worm drive in view of the known self-locking action of a worm. The linear motor of the invention offers the advantage of the free-wheeling property in an extremely simple manner. By a suitable switching it can, as desired, be freeely movable or else lockable in its instantaneous position.

By other measures, advantageous further developments and improvements of the linear motor are possible. Of particular advantage is the flat shape of the rotor, which leads to a compact construction of the linear motor.

Further, the rotor elements contain additional piezoelectric elements (clamping elements) (6, 7).

Still further, by the application of an electric voltage there is effected an expanding of the clamping elements (6, 7) transverse to the direction of movement and an expanding of the actuator element (8) in the direction of movement.

Also, the rotor (1) is developed in flat shape, the rotor elements contain the clamping elements (6, 7) in a frame-like holder (9) and at least one side (12) of the frame-like holder is movable with respect to the other sides.

Yet, according to a further feature, the actuator elements (8; 13, 14, 15) are fastened to the frame-like holders (9), preferably by cementing.

Moreover, plates (16, 17; 18, 19) cover both sides of the rotor elements and the actuator elements (8; 13, 14, 15), said plates serving simultaneously as slide elements.

Also, two plates (16, 17; 18, 19) are provided for each rotor element and a joint closed by elastic material is present between the plates of the one rotor element and the plates of the other rotor element.

A further feature is that the piezoelectric elements (10, 11, 13, 14, 15) are constructed in layer form from a plurality of individual elements, with the use of additional layers of fiber-reinforced plastic.

Still further according to the invention, there is a stator (2) of rectangular inner cross section which extends in the direction of movement.

Also there is a control circuit, which provides the piezoelectric elements with voltage for moving the rotor (1) by in each case one step in the following sequence:

voltage of the one clamping element ON;
voltage of the other clamping element OFF;
voltage of the actuator element ON;
voltage of the other clamping element ON;
voltage of the one clamping element OFF;
voltage of the actuator element OFF.

Further, the control circuit comprises a shift register (26) and one output stage each (27, 28, 29) for the clamping elements (6, 7) and the actuator element (8).

Moreover, the control circuit furthermore contains a logic circuit (37, 38, 39, 40) to which a control signal can be so fed that both clamping elements (6, 7) are without voltage.

Yet further, the path of the rotor (1) moved over upon each step can be controlled by means of the voltage fed to the actuator element (8).

Still further, there is provided a position sensor, preferably a resistance path (23) arranged on the stator and a wiper arranged on the rotor.

BRIEF DESCRIPTION OF THE DRAWINGS

With the above and other objects and advantages in view, the present invention will become more clearly understood in connection with the detailed description of a preferred embodiment when considered with the accompanying drawings, of which:

FIG. 2 is a circuit diagram of a control circuit; and

FIG. 3 is a diagram of the rotor and of the clamping elements showing the individual phases of the movement.

DETAILED DESCRIPTION OF THE PREFERRED EMBODIMENT

Figure 1:
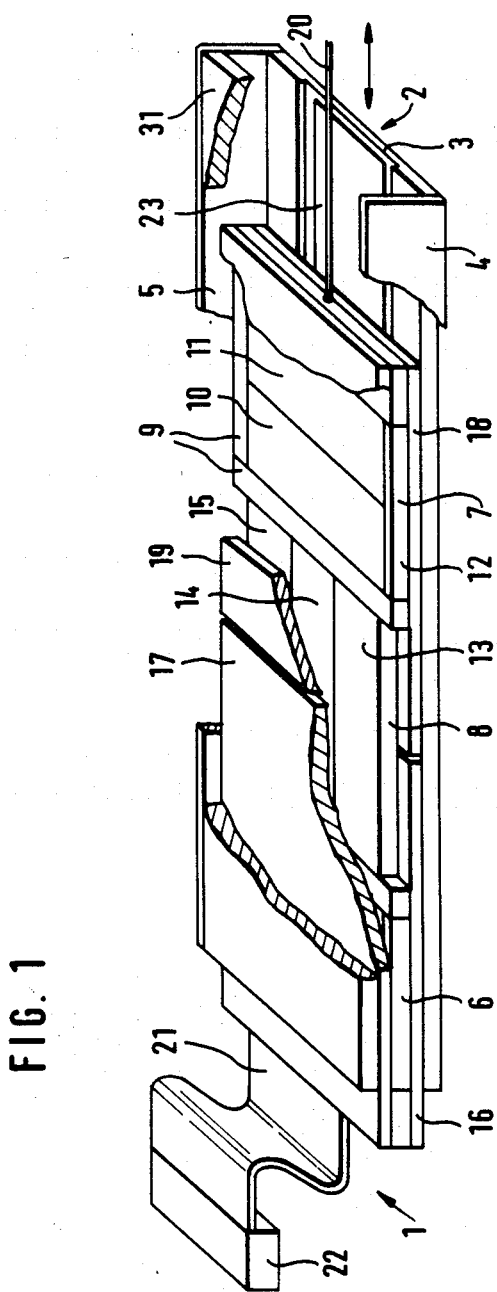
FIG. 1 is a partial fragmentary perspective showing of the embodiment.

The rotor 1 of the linear motor shown in FIG. 1 is movable within the stator 2 in the direction indicated by the arrowheads. The stator 2 consists of two plates 3, 31 and two side walls 4, 5 which laterally limit the motor.

The rotor 1 consists of two clamping elements 6, 7 and an actuator element 8 arranged between them. Each of the clamping elements 6, 7 is formed of a frame-like holder 9 in which the piezoelectric elements 10, 11 are inserted. By applying an electric voltage to the electrodes (not shown) of the piezoelectric elements 10, 11 their lengthwise expansion transverse to the direction of movement is increased so that the pressure ledge 12 moves forward. In this way the clamping element 6, 7 is clamped between the two side walls 4, 5 of the stator 2.

In the embodiment shown, the actuator element 8 consists of three piezoelectric elements 13, 14, 15, which expand in the direction of movement upon the application of an electric voltage to the electrodes (not shown in the drawing). At their ends the piezoelectric elements 13, 14 and 15 are firmly connected to the corresponding holder 9 of the clamping element 6 or 7. This can be effected preferably by suitable cementing.

In order to permit suitable sliding of the rotor within the stator and furthermore to protect the piezoelectric elements from environmental influences, the elements 6, 7, 8 lie between plates 16, 17, 18 and 19. In order not to impede the longitudinal expansion of the rotor caused by the actuator element 8, a slot is provided in each case between the plates 16 and 18 and 17 and 19 respectively, this slot being filled with elastic material. A Bowden cable or a rod system 20 can be connected to the rotor 1, it being merely diagrammatically shown in FIG. 1. As material for the stator 2, the holder 9 and the plates 16, 17, 18 and 19 steel can advantageously be employed.

The electric wires (not shown in detail) to the electrodes of the piezoelectric elements are combined in a flat ribbon cable 21 having a connector 22.

For the electrical detection of the instantaneous position of the rotor 1, a resistance path 23 is arranged insulated in a depression in the plate 3 of the stator 2 in the case of the linear motor shown in FIG. 1. If the ends of this resistance path are acted on by an electric voltage then a voltage proportional to the position of the rotor can be tapped off from a wiper which is arranged on the rotor. Other position sensors such as, for instance, magnetically or optically scannable rasters can also be used in combination with the linear motor of the invention.

The mechanical construction having been described on basis of FIG. 1, the operation of the linear motor of the invention will now be explained on basis of FIGS. 2 and 3. FIG. 2 gives an example of a control circuit for a linear motor according to the invention. It consists essentially of a shift register 26 by means of which the clamping elements 6, 7, which are connected via the output stages 27, 28, 29 to outputs of the shift register 26, and the actuator element 8 are controlled in a specific predetermined sequence. The output stages are shown in FIG. 2 as merely simple switching transistors. However, the specific development of the output stages—particularly the matching of the output stages to the capacitive load—lies within the scope of the knowledge of the man skilled in the art.

Since the piezoelectric elements in the embodiment shown require a voltage of about 100 volts while the entire arrangement is intended for operation at lower voltages, a suitably high voltage is obtained from the battery voltage, fed at 30, by means of a switch transistor 32 whose collector is connected via a resistor 33 to the source of operating voltage and a rectifier cascade 34. For this purpose the transistor is controlled by square pulses via the input 35 of the circuit.

By the suitable switching of the shift register 26 the control sequence of the piezoelectric elements which is shown in connection with FIG. 3 is now obtained. The clamping elements 6 and 7 as well as the rotor 1 together with the actuator element 8 are shown diagrammatically for different phases of movement upon movement to the right in FIG. 3a and upon movement to the left in FIG. 3b.

During the first phase, the clamping element 7 is activated and therefore clamps. In the second phase, which serves, so to speak, as preparation for the travel to the right, the clamping element 6 is activated while the clamping element 7 is in the position of rest. In the third phase, the actuator element 8 is actuated so that the rotor 1 expands. Thereupon, in the following phase, the clamping element 7 is actuated so that the right-hand part of the rotor is clamped. Then, in the next phase, the clamping element 6 is deactivated and, finally, in the last phase shown, the actuator element 8 is deactivated so that the rotor now again has its original length, but has been moved a step further to the right. Since the piezoelectric elements follow the applied voltage extremely rapidly, the step described can be effected within a short time, for instance about 100 microseconds.

Upon movement to the left as shown in FIG. 3b the control of the individual piezoelectric elements takes place in the reverse sequence to that present upon movement to the right.

With the control circuit shown in FIG. 2, the clock for the controlling of the shift register 26 is obtained by means of a frequency divider 36 from the square voltage fed at 35. In order to obtain the sequence explained in connection with FIG. 3, the inputs D0 to D4 are placed firmly, to L and/or H as shown in the figure. Control of the linear motor with respect to movement to the left and movement to the right as well as stop, is made possible by suitable connection of the inputs S0 and S1 in accordance with the table shown in the figure.

In each of the feed wires from the outputs of the shift register 26 to the output stages 27 and 29 for the clamping elements 6 and 7 there are inserted two NOR gates 37, 38, 39 and 40 respectively. They serve to link a control signal fed at 41 to the signals produced by the shift register. By means of that NOR gate 37, 39 which is first in each case, merely an inverting of the output signal of the shift register is obtained while the second gate 38 and 40 in each case forwards the control signals of the shift register only when an L (low) level is fed at 41. If this is not the case and if therefore an H (high) level is present at 41, then an L level results at the outputs of the NOR gates 38 and 40 independently of the signal fed by the shift register 26, as da result of which the output stages 27, 29 are switched into non-conductive state. The two clamping elements are thus not activated and the rotor 1 can move freely within the stator. Compared with the known electromagnetic linear drives, this circuit acts like a clutch.

When a linear motor in according to the invention is not carrying out any movement it can, optionally, be either freely movable or blocked. The switching is effected by an electric signal which is fed at 41. Furthermore, the path moved over by the rotor 1 upon one step can be controlled by changing the voltage fed to the actuator element 8.

Finally, the control circuit can form a single structural unit together with the linear motor, preferably with the rotor. In this way the result is obtained that only a few lines—and in particular no lines carrying high voltage—need be connected to the linear motor.

I claim:

1. A linear motor comprising:
   a rotor;
   a stator;
   at least one piezoelectric element; and wherein
   said rotor comprises two rotor elements which are individually clampable to the stator as a function of a signal fed to the rotor, said rotor elements being connected by said at least one piezoelectric element by which the distance apart of said rotor elements is variable as a function of a control signal applied to said at least one piezoelectric element; and wherein
   said rotor has a flat shape, siad motor further comprising
   a frame-like holder containing said rotor elements, and wherein
   at least one side of said frame-like holder is movable with respect to the other sides.

2. The linear motor as set forth in claim 1, wherein each of said rotor elements contain additional piezoelectric elements.

3. The linear motor as set forth in claim 2, wherein said additional piezolectric elements are clamping elements.

4. The linear motor as set forth in claim 3, further comprising
   means for effecting, by application of an electric voltage, an expanding of said clamping elements transverse to a direction of movement and an expanding of the first-mentioned piezoelectric element in the direction of movement.

5. The linear motor as set forth in claim 1, wherein said at least one piezoelectric element is an actuator, said actuator elements being fastened to said frame-like holder.

6. The linear motor as set forth in claim 5, wherein said actuator elements are fastened to said frame-like holder by cementing.

7. The linear motor as set forth in claim 5 further comprising
   plates covering both sides of said rotor elements and said actuator elements, said plates serving also as slide elements.

8. The linear motor as set forth in claim 7, wherein two of said plates are located adjacent each of said rotor elements, said plates defining a joint, and wherein
   said joint is closed by elastic material, said joint being disposed between said plates of one of said rotor elements and said plates of the other of said rotor elements.

9. The linear motor as set forth in claim 1, wherein said piezoelectric elements have a layer made of a plurality of individual elements, and layers of fiber-reinforced plastic.

10. The linear motor as set forth in claim 1, wherein said stator has a rectangular inner cross section which extends in the direction of movement.

11. The linear motor as set forth in claim 1, wherein said at least one piezoelectric element is an actuator element, said motor further comprising
    a control circuit, for providing said piezoelectric elements with voltage for moving said rotor in each case by one step in the following sequence:
    voltage of one clamping element ON;
    voltage of the other clamping element OFF;
    voltage of the actuator element ON;
    voltage of the other clamping element ON;
    voltage of the one clamping element OFF;
    voltage of the actuator element OFF.

12. The linear motor as set forth in claim 11, wherein said control circuit comprises a shift register and one output stage each for the clamping elements and said actuator element.

13. The linear motor as set forth in claim 11, wherein said control circuit comprises a logic circuit to which a control signal is feedable so that both said clamping elements are without voltage.

14. The linear motor as set forth in claim 11, wherein a path of said rotor traversed upon each step is controllable by means of the voltage feed to the actuator element.

15. The linear motor as set forth in claim 1, further comprising
    a position sensor positioned on said stator, and a wiper positioned on said rotor.

16. The linear motor as set forth in claim 15, wherein said position sensor is a resistance path.

17. The linear motor as set forth in claim 1, wherein said piezoelectric element is an actuator element.

* * * * *